US009699648B2

(12) United States Patent
Quan et al.

(10) Patent No.: US 9,699,648 B2
(45) Date of Patent: Jul. 4, 2017

(54) METHOD FOR REPORTING USER EQUIPMENT ASSISTANCE INFORMATION REPORTING, USER EQUIPMENT, AND BASE STATION

(71) Applicant: Huawei Technologies Co., Ltd., Shenzhen, Guangdong (CN)

(72) Inventors: Wei Quan, Beijing (CN); Yuhua Chen, Shenzhen (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/573,272

(22) Filed: Dec. 17, 2014

(65) Prior Publication Data

US 2015/0105062 A1 Apr. 16, 2015

Related U.S. Application Data

(63) Continuation of application No. PCT/CN2012/077331, filed on Jun. 21, 2012.

(51) Int. Cl.
 *H04M 3/00* (2006.01)
 *H04W 8/24* (2009.01)
 *H04W 76/04* (2009.01)

(52) U.S. Cl.
 CPC ........... *H04W 8/24* (2013.01); *H04W 76/048* (2013.01)

(58) Field of Classification Search
 CPC ..................... H04M 1/72519; H04W 28/0278
 (Continued)

(56) References Cited

U.S. PATENT DOCUMENTS

2004/0229572 A1 11/2004 Cai et al.
2006/0003788 A1* 1/2006 Yokoshi ............... H04M 1/6066
455/522

(Continued)

FOREIGN PATENT DOCUMENTS

CN 1784909 A 6/2006
CN 1905738 A 1/2007
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.5.0, pp. 1-302, 3rd Generation Partnership Project, Valbonne, France (Mar. 2012).

(Continued)

*Primary Examiner* — Kiet Doan
(74) *Attorney, Agent, or Firm* — Leydig, Voit & Mayer, Ltd.

(57) ABSTRACT

The present invention provides a method for reporting user equipment assistance information, a user equipment, and a base station. The method includes: if a configuration in a user equipment UE for forbidding sending UE assistance information is not started or is closed, sending, by the UE, the UE assistance information to a base station; or, if a configuration in a UE for allowing sending UE assistance information is started, sending, by the UE, the UE assistance information to a base station. The foregoing method does not increase a signaling overhead of an air interface, and meanwhile, enables abase station to better optimize performance of a UE according to UE assistance information.

6 Claims, 4 Drawing Sheets

(58) Field of Classification Search
USPC ..... 455/438, 7, 414.2, 456.1, 450, 522, 411, 455/422.1, 456.3, 414.1; 370/311, 329, 370/338, 249, 252, 235
See application file for complete search history.

(56) References Cited

U.S. PATENT DOCUMENTS

| | | | | |
|---|---|---|---|---|
| 2007/0026865 | A1* | 2/2007 | Yano | H04W 36/18 455/438 |
| 2007/0127645 | A1 | 6/2007 | Bloebaum et al. | |
| 2009/0098880 | A1* | 4/2009 | Lindquist | G01S 19/34 455/456.1 |
| 2010/0302980 | A1* | 12/2010 | Ji | H04W 52/0216 370/311 |
| 2011/0009124 | A1* | 1/2011 | Kostic | H04W 76/025 455/450 |
| 2011/0256884 | A1* | 10/2011 | Kazmi | H04W 48/04 455/456.1 |
| 2012/0002545 | A1* | 1/2012 | Watfa | H04W 48/06 370/235 |
| 2012/0069805 | A1* | 3/2012 | Feuersanger | H04W 72/1284 370/329 |

FOREIGN PATENT DOCUMENTS

| | | |
|---|---|---|
| CN | 101675639 A | 3/2010 |
| CN | 102378111 A | 3/2012 |
| WO | WO 2010041348 A1 | 4/2010 |

OTHER PUBLICATIONS

"3$^{rd}$ Generation Partnership Project; Technical Specification Group Radio Access Network; LTE RAN Enhancements for Diverse Data Applications (Release 11)," 3GPP TR 36.822, V1.0.0, 3$^{rd}$ Generation Partnership Project, Valbonne, France (Jun. 2012).

"A Framework for Management of Background Traffic UEs," 3GPP TSG-RAN WG2 Meeting #77bis, Jeju, South Korea, R2-121609, 3$^{rd}$ Generation Partnership Project, Valbonne, France (Mar. 26-30, 2012).

"UE assistance information for UE power saving and optimized network performance," 3GPP TSG-RAN WG2 Meeting #77bis, Jeju, South Korea, R2-121203, 3$^{rd}$ Generation Partnership Project, Valbonne, France (Mar. 26-30, 2012).

"DRX configuration retention while moving from connected to Idle," 3GPP TSG-RAN WG2 #78, Prague, Czech Republic, R2-122505, 3$^{rd}$ Generation Partnership Project, Valbonne, France (May 21-25, 2012).

* cited by examiner

METHOD FOR REPORTING USER EQUIPMENT ASSISTANCE INFORMATION REPORTING, USER EQUIPMENT, AND BASE STATION

CROSS-REFERENCE TO RELATED APPLICATIONS

This application is a continuation of International Patent Application No. PCT/CN2012/077331, filed on Jun. 21, 2012, which is hereby incorporated by reference in its entirety.

TECHNICAL FIELD

Embodiments of the present invention relate to communications technologies, and in particular, to a method for reporting user equipment assistance information, a user equipment, and a base station.

BACKGROUND

In a discussion about an enhancement on diverse data applications work item (EDDA WI) standard in the 3rd generation partnership project (3GPP), it is mentioned that a user equipment (UE) may provide some UE assistance information of a background service or an instant message (IM) as reference for a network device.

However, there is no clear and unified understanding so far about which UE assistance information needs to be reported, how to trigger the reporting of the UE assistance information, and after receiving the UE assistance information, how a network side performs optimization, and the like.

Currently, a trigger mechanism for sending the UE assistance information is not clear, resulting in problems that the UE may continuously report the UE assistance information to a base station, which easily increases a signaling overhead of an air interface, and the UE assistance information cannot be better applied by the base station.

SUMMARY

In view of this, the present invention provides a method for reporting user equipment assistance information, a user equipment, and a base station, which are used to save a signaling overhead of an air interface, and meanwhile, enable a base station to better optimize performance of a UE according to UE assistance information.

In a first aspect, an embodiment of the present invention provides a method for reporting user equipment assistance information, including:
  if a configuration in a UE for forbidding sending UE assistance information is not started or is closed, sending, by the UE, the UE assistance information to a base station;
  or,
  if a configuration in a UE for allowing sending UE assistance information is started, sending, by the UE, the UE assistance information to a base station.

In a second aspect, an embodiment of the present invention provides a method for reporting user equipment assistance information, including:
  receiving UE assistance information sent by a UE when a configuration of the UE for forbidding sending the UE assistance information is not started or is closed;
  or,
  receiving UE assistance information sent by a UE when a configuration of the UE for allowing sending the UE assistance information is started.

In a third aspect, an embodiment of the present invention provides a user equipment, including:
  a determining unit, configured to: if determining that a configuration in the UE for forbidding sending UE assistance information is not started or is closed, transmit, to a sending unit, an instruction for sending the UE assistance information; or if determining that a configuration in the UE for allowing sending UE assistance information is started, transmit, to a sending unit, an instruction for sending the UE assistance information; and
  the sending unit, configured to send the UE assistance information to a base station when receiving the instruction which is transmitted by the determining unit and is for sending the UE assistance information.

In a fourth aspect, an embodiment of the present invention provides a base station, including:
  a receiving unit, configured to receive UE assistance information sent by a UE when a configuration of the UE for forbidding sending the UE assistance information is not started or is closed;
  or, configured to receive UE assistance information sent by a UE when a configuration of the UE for allowing sending the UE assistance information is started.

It can be known from the foregoing technical solutions that, in the method for reporting user equipment assistance information, the user equipment, and the base station according to the embodiments of the present invention, if the configuration in the UE for forbidding sending the UE assistance information is not started or is closed, the UE sends the UE assistance information to the base station; or, if the configuration in the UE for allowing sending the UE assistance information is started, the UE sends the UE assistance information to the base station, so that the UE may regularly report the UE assistance information, thereby reducing the signaling overhead of the air interface.

BRIEF DESCRIPTION OF DRAWINGS

To describe the technical solutions of the present invention more clearly, the following briefly introduces accompanying drawings required for describing the embodiments. Apparently, the accompanying drawings in the following description show merely some embodiments of the present invention, and persons of ordinary skill in the art may still derive other drawings according to these accompanying drawings without creative efforts.

DESCRIPTION OF EMBODIMENTS

In order to make the objectives, technical solutions and advantages of the present invention clearer, the technical solutions of the present invention are described clearly and fully in the following with reference to the accompanying drawings in the embodiments of the present invention. Obviously, the following embodiments are merely part of the embodiments of the present invention. Based on the following embodiments of the present invention, persons of ordinary skill in the art may also obtain other embodiments which can solve problems in the present invention and achieve technical effects of the present invention by equivalently transforming part and even all of technical features even though without making creative effects, and the embodiments obtained through transformation obviously do not depart from the scope disclosed in the present invention.

An embodiment of the present invention provides a method for reporting user equipment assistance information, where the method includes: if a configuration in a UE for forbidding sending UE assistance information is not started or is closed, sending, by the UE, the UE assistance information to a base station; or, if a configuration in a UE for allowing sending UE assistance information is started, sending, by the UE, the UE assistance information to a base station, so that the base station optimizes performance of the UE according to the UE assistance information. The foregoing method enables the UE to regularly report the UE assistance information, thereby reducing a signaling overhead of an air interface.

Figure 1:
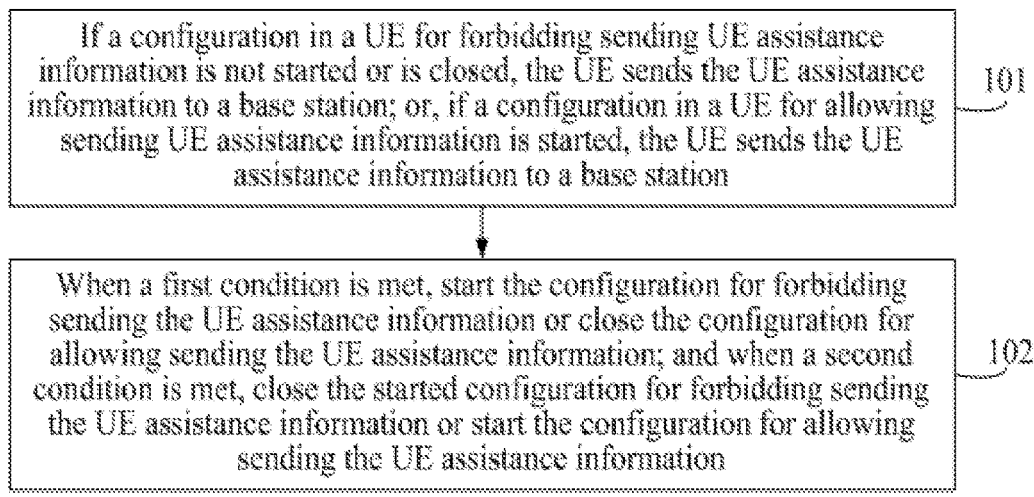
FIG. 1 is a schematic flow chart of a method for reporting user equipment assistance information provided in an embodiment of the present invention.

FIG. 1 shows a schematic flow chart of a method for reporting user equipment assistance information provided in an embodiment of the present invention. As shown in FIG. 1, the method for reporting user equipment assistance information in this embodiment is described as follows.

101: If a configuration in a UE for forbidding sending UE assistance information is not started or is closed, the UE sends the UE assistance information to a base station; or, if a configuration in a UE for allowing sending UE assistance information is started, the UE sends the UE assistance information to a base station.

For example, the foregoing UE assistance information may be one or more pieces of the following information:
a power saving preference of the UE, a performance preference of the UE, a service feature of the UE, a moving speed of the UE, and a parameter indicating the moving speed of the UE, and the like, where the parameter indicating the moving speed of the UE is, for example, a variation of reference signal received power (RSRP) of the UE in a certain time, a variation of a path loss, or a variation of an observed time difference of arrival ((JTDOA, and used for reflecting a time difference between downlink signal receiving time of different cells) of different cells, or the like; specific content of the UE assistance information is not limited in this embodiment.

In actual application, the foregoing UE assistance information may be sent by using a radio resource control (RRC) message or a media access control (MAC) layer message. The MAC layer message may use a MAC CE (MAC Control Elements), or may also use a reserved bit in a MAC PDU header.

When the UE assistance information is sent by using an RRC message, a new information element (IE) may be defined and carried in an existing RRC message such as a measurement report message, and the measurement report message carrying the UE assistance information may be further sent to the base station.

In another embodiment, a new IE may be defined and carried in an existing RRC message such as a radio resource control connection reconfiguration complete message or carried in another uplink RRC message and sent to the base station. After receiving the RRC message, the base station obtains the IE by parsing the RRC message, and further optimizes the UE according to the IE obtained by parsing. Particularly, the RRC message herein may also be borne on a dedicated radio bearer established between the base station and the UE.

Further, a new RRC message may be further defined, and the new RRC message is used to perform the reporting.

When the MAC CE message is used to send the UE assistance information, a new logical channel identity (LCID) needs to be defined to indicate the UE assistance information, for example, one of currently reserved values 01011-11000 or a reserved bit in an existing message is used to send the UE assistance information, and then the foregoing UE assistance information can be sent to the base station.

102: When a first condition is met, start the configuration for forbidding sending the UE assistance information or close the configuration for allowing sending the UE assistance information; and when a second condition is met, close the started configuration for forbidding sending the UE assistance information or start the configuration for allowing sending the UE assistance information.

For example, the first condition is one or more of the following conditions:
the UE receives a message which is sent by the base station and is used for starting the configuration for forbidding sending the UE assistance information or used for closing the configuration for allowing sending the UE assistance information; and
a duration after the UE assistance information is sent to the base station reaches a preset duration, where the preset duration may be 0 or any other value such as 1s and 5s, that is, after the UE assistance information is sent to the base station, the configuration for forbidding sending the UE assistance information may be started; and certainly, the preset duration herein may also be a default value and the like.

The second condition is one or more of conditions listed in the following (1) to (7):

(1) The UE receives an RRC reconfiguration message sent by the base station.

(2) The UE receives a reconfiguration message which is sent by the base station and includes a discontinuous reception (DRX) parameter.

(3) A DRX cycle in the DRX parameter included in the reconfiguration message which is sent by the base station and received by the UE reaches a pre-configured DRX cycle or reaches an idle status DRX cycle. The DRX cycle in the current reconfiguration message may be a long DRX cycle or a short DRX cycle. The idle status DRX cycle refers to a DRX cycle used by the UE in an idle status, and the idle status DRX cycle is usually a smaller one between a DRX cycle which is notified by the UE to an MME and is used by the UE and a cell level DRX cycle broadcast by the base station. Certainly, the cycle may also be defined as the DRX cycle which is notified by the UE to the MME and is used by the UE, or the cell level DRX cycle broadcast by the base station. The pre-configured DRX cycle may be a DRX cycle fixedly configured according to a protocol, or may also be a DRX cycle configured by the base station through a broadcasting message or a dedicated message.

(4) The UE receives an instruction which is sent by the base station and is for acquiring the UE assistance information, or the UE receives an instruction which is sent by the base station and is for again acquiring the UE assistance information.

(5) A duration in which the configuration for forbidding sending the UE assistance information is started reaches a preset threshold, or a duration in which the configuration for allowing sending the UE assistance information is closed reaches a preset threshold. The preset threshold may be 10 seconds, 60 seconds, or the like, which is set by the UE according to actual requirements.

(6) The UE changes an RRC connection status.

(7) Content of the UE assistance information is changed (for example, assistance information of the power saving preference of the UE is replaced with assistance information of the moving speed of the UE).

In actual application, a configuration for forbidding sending the UE assistance information may be set in the foregoing UE, or a configuration for allowing sending the UE assistance information is set in the UE. Which configuration is set in the UE is not limited in this embodiment.

Therefore, if the configuration in the UE for forbidding sending the UE assistance information is not started or is closed, the UE assistance information is sent to the base station. Correspondingly, when the first condition is met, the configuration for forbidding sending the UE assistance information is started, and when the second condition is met, the started configuration for forbidding sending the UE assistance information is closed.

In another embodiment, if the configuration in the UE for allowing sending the UE assistance information is started, the UE assistance information is sent to the base station. Correspondingly, when the first condition is met, the configuration for allowing sending the UE assistance information is closed, and when the second condition is met, the configuration for allowing sending the UE assistance information is started.

The foregoing UE assistance information reporting method can enable the UE to regularly report the UE assistance information, thereby reducing a signaling overhead of an air interface.

Figure 2:
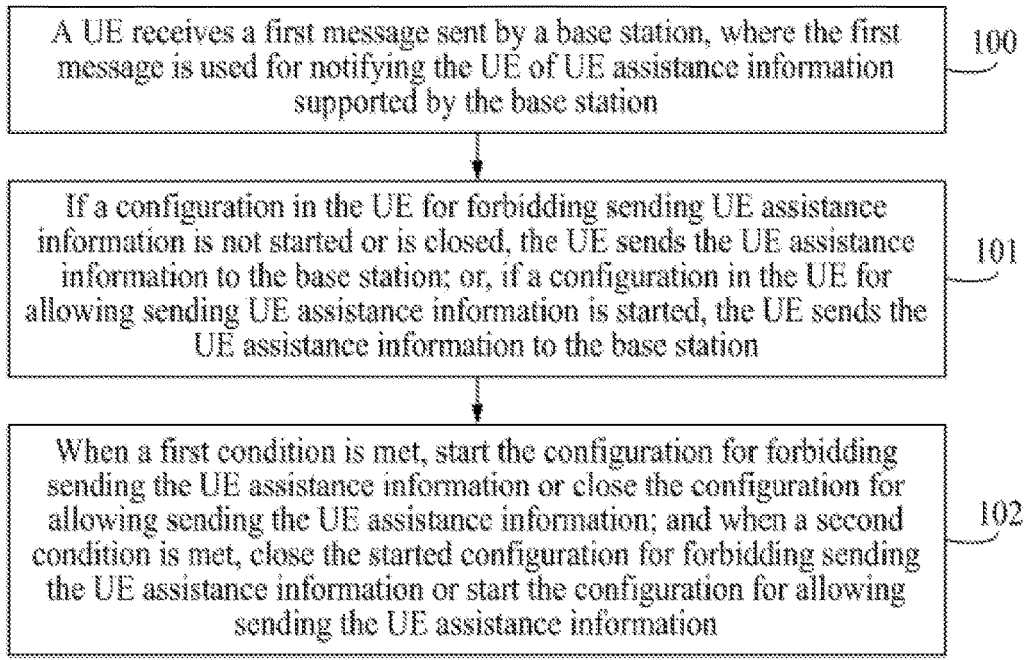
FIG. 2 is a schematic flow chart of a method for reporting user equipment assistance information provided in another embodiment of the present invention.

In another embodiment, as shown in FIG. 2, before the UE assistance information is sent to the base station in step 101, the foregoing method for reporting user equipment assistance information may further include the following step 100.

100: The UE receives a first message sent by the base station, where the first message is used for notifying the UE of UE assistance information supported by the base station.

Preferably, the UE receives the first message sent by the base station in a broadcast manner.

Further, the first message may further include one or more pieces of the following information: (1) information of a radio bearer (RB) where the UE assistance information is located; and (2) attribute information of the UE assistance information, a sending forbidden mechanism, and information of a dedicated RB where the UE assistance information is located, and the like. For example, the attribute information of the UE assistance information may include that a sending priority of the UE assistance information is lower than a sending priority of data, and the UE assistance information does not trigger a buffer status report (BSR), a scheduling request (SR), or the like. When the UE sends data by using an uplink resource, the BSR is used for notifying the base station of an amount of data in the UE which may be sent, so that the base station allocates an uplink resource for the UE for data sending. Usually, the BSR is triggered when new data or data with a higher priority reaches a packet data convergence protocol (PDCP) entity or a radio link control (RLC) entity of the UE and can be sent; in this case, if the UE does not have an uplink resource used for sending the BSR, the SR is triggered to request the base station to allocate an uplink resource. In another manner of triggering the BSR, there is still a remaining resource after current uplink resources transmit uplink data, a padding BSR may be triggered, where the BSR may notify the base station how much data in the UE remains to be transmitted, so as to assist the base station with subsequent resource allocation.

That is to say, the base station may notify the UE of the UE assistance information supported by the base station. Only when the base station supports the UE assistance information, the UE assistance information may be used to optimize a network or the UE, and the UE is further allowed to report the UE assistance information.

In actual application, a UE which does not support the UE assistance information neglects the foregoing first message notified by the base station. In addition, if a specific embodiment includes the foregoing step 100 shown in FIG. 2, in this case, if the UE does not receive the foregoing first message, the UE does not send the UE assistance information to the base station even if the configuration of the UE for forbidding sending the UE assistance information is not started or the configuration of the UE for allowing sending the UE assistance information is started.

In another embodiment, the base station may further carry the foregoing information used for notifying the UE of the UE assistance information supported by the base station in another message sent to the UE, and this embodiment is merely an example for description.

Figure 3:
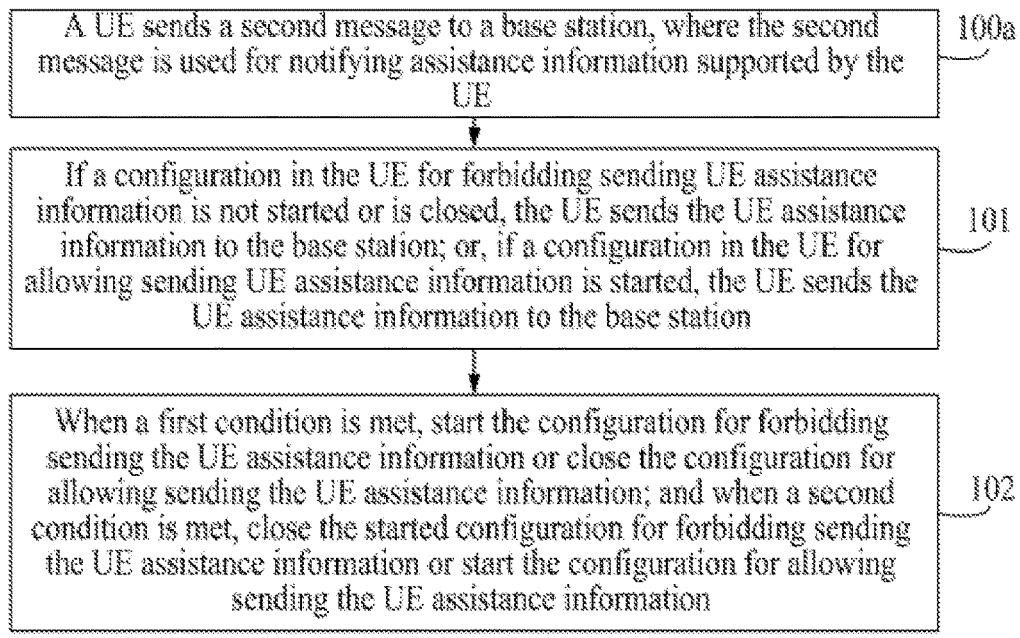
FIG. 3 is a schematic flow chart of a method for reporting user equipment assistance information provided in another embodiment of the present invention.

In another application scenario, as shown in FIG. 3, before the UE assistance information is sent to the base station in step 101, the foregoing method for reporting user equipment assistance information may further include the following step 100a.

100a: The UE sends a second message to the base station, where the second message is used for notifying assistance information supported by the UE.

For example, the UE notifies the base station that the UE supports the assistance information of the power saving preference of the UE.

It can be understood that, that the UE reports the supported UE assistance information to the base station may specifically be that the UE directly reports the supported UE assistance information to the base station, or reports the supported UE assistance information to a mobile management entity (MME), and then the MME notifies the base station of the UE assistance information supported by the UE.

For example, the UE may report the supported UE assistance information to the MME during attachment, and subsequently, does not report again.

Or, the UE reports the supported UE assistance information each time the UE enters an RRC connection status, or the UE reports the supported UE assistance information to the MME when the UE assistance information supported by the UE is changed. A manner for the UE to report the supported UE assistance information to a network side is not limited in this embodiment.

Preferably, if the UE also supports the UE assistance information and the UE obtains the first message sent by the base station (that is, step 100 and step 100a in the description of the foregoing example may be included), UE assistance information which can be sent to the base station may be negotiated and determined. After the UE meets the second condition in step 102 in FIG. 1, the UE is allowed to report the UE assistance information to the base station.

It can be known from the foregoing embodiment that the method for reporting user equipment assistance information in this embodiment enables the UE to regularly report the UE assistance information, thereby reducing the signaling overhead of the air interface, and further enables the base station to optimize performance of the UE according to the UE assistance information.

Figure 4:
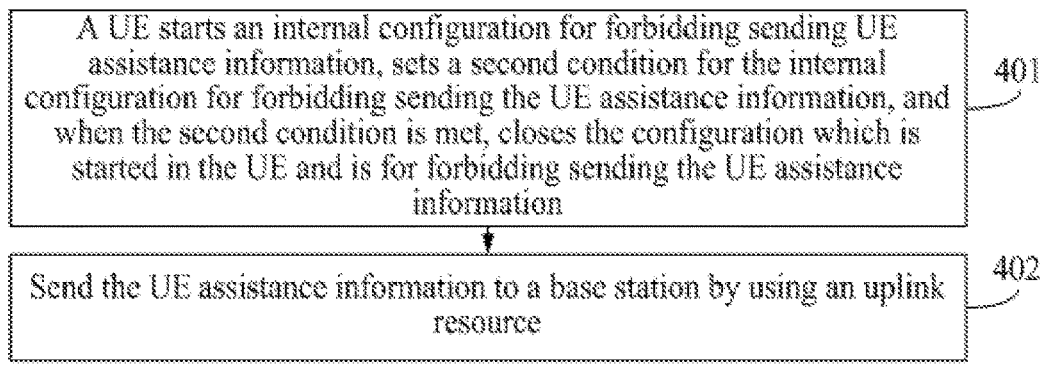
FIG. 4 is a schematic flow chart of a method for reporting user equipment assistance information provided in another embodiment of the present invention.

FIG. 4 shows a schematic flow chart of a method for reporting user equipment assistance information provided in another embodiment of the present invention. As shown in FIG. 4, the method for reporting user equipment assistance information in this embodiment is described as follows.

401: A UE starts an internal configuration for forbidding sending UE assistance information, sets a second condition for the internal configuration for forbidding sending the UE assistance information, and when the second condition is met, closes a configuration which is started in the UE and is for forbidding sending the UE assistance information.

In this embodiment, before the second condition is met, the UE is not allowed to send the UE assistance information to abase station.

For example, the second condition may be that the UE receives a message sent by the base station, such as an RRC reconfiguration message, a query message, or any RRC message, or another message. In a specific embodiment, the message sent by the base station may further be a reconfiguration message including a DRX parameter. For example, the reconfiguration message may include a DRX cycle, or a time length of a timer related to DRX, or the like. After receiving the foregoing reconfiguration message including the DRX parameter, the UE parses the foregoing reconfiguration message and acquires a related condition, for example, a condition in which before the DRX cycle reaches an idle status DRX cycle, the UE may again report the UE assistance information to the base station, and after the DRX cycle reaches the idle status DRX cycle, the UE cannot report the UE assistance information.

Certainly, the foregoing second condition may further be that the UE changes an RRC connection status, for example, during a current RRC connection status, the UE is merely allowed to report the UE assistance information to the base station for once, and only when the RRC connection status is changed, the foregoing configuration which is started in the UE and is for forbidding sending the UE assistance information is closed.

In addition, the second condition may further be that only when content of the UE assistance information is changed, the UE can again send the UE assistance information, for example, a power saving preference of the UE is changed.

Or, only after the base station triggers the UE to report the UE assistance information, the UE can again report the UE assistance information to the base station. For example, the base station indicates, in the RRC message or a MAC layer message whether the UE assistance information is allowed to be (again) reported. The second condition in this embodiment is merely an example for description.

402: Send the UE assistance information to the base station by using an uplink resource.

In this embodiment, assistance information of the power saving preference of the UE in the UE is in a triggered status, and in this case, when the configuration for forbidding sending the UE assistance information is closed, the assistance information of the power saving preference of the UE is sent to the base station through the uplink resource.

Particularly, in the uplink resource, a sending priority of the UE assistance information is lower than a sending priority of data. For example, when the UE assistance information is sent through a MAC CE, the sending priority of the UE assistance information is lower than priorities of the RRC message and the data.

Certainly, in another embodiment, the sending priority of the UE assistance information is lower than a sending priority of a padding buffer status report (Padding BSR).

In actual application, the sending the UE assistance information to the base station by using an uplink resource includes: when the uplink resource can accommodate all data which can be transmitted and the uplink resource still can transmit the UE assistance information, sending the UE assistance information to the base station by using the uplink resource. That is to say, only all the data which can be transmitted is transmitted within a transmission time interval (Transmission Time Interval, TTI for short), the UE assistance information can be sent.

In actual application, because the UE assistance information is usually not urgent, it is unnecessary to send the UE assistance information once the sending is triggered; otherwise, an additional signaling overhead and power overhead may occur. A preferable method may be:

establishing, by the base station, a dedicated radio bearer (Radio Bearer, RB for short) used for bearing the foregoing message carrying the UE assistance information, where the dedicated RB may be a signaling radio bearer or a data radio bearer.

Certainly, to prevent the UE from frequently sending the UE assistance information through the foregoing RB, when there is the UE assistance information on the bearer, the BSR is not triggered, for example, it is set that the dedicated RB does not belong to any logical channel group (LCG); or when there is the UE assistance information on the bearer, a scheduling request (SR) is not triggered, for example, a logical channel SR masking (logical channel scheduling request masking) attribute of the RB is set.

In another embodiment, the foregoing step 402 may also be that the UE receives an instruction which is sent by the base station and is for acquiring the UE assistance information, and sends, according to the instruction for acquiring the UE assistance information, the UE assistance information to the base station by using the uplink resource.

Further, in the instruction for acquiring the UE assistance information, the base station may further set some attributes for the UE assistance information, for example, information of an RB where the UE assistance information is located, a sending forbidden mechanism, an attribute of masking (such as BSR Masking or SR Masking), or another sending attribute which indicates the UE assistance information and is different from another RRC message. A specific setting method may be defined by a protocol or configured by the base station. When the UE assistance information needs to be sent, the UE assistance information may not trigger the BSR or the SR according to the foregoing set attribute. For example, when the BSR Masking is true, the UE assistance information does not trigger the BSR; or when the SR Masking is true, the UE assistance information does not trigger the SR.

It can be understood that the sending of the UE assistance information may be triggered based on UE implementation, or based on a configuration by the base station for the UE.

Certainly, a trigger mechanism in the UE for sending the UE assistance information is based on the UE implementation in most cases. For example, a higher layer in the UE instructs the UE to send the message carrying the UE assistance information, where the higher layer of the UE may be a non access stratum (NAS) of the UE.

Particularly, for the assistance information of the power saving preference of the UE, different UEs may have different implementation, for example, some UEs determine, according to their respective remaining power, whether to trigger the sending of the UE assistance information; some UEs may determine, according to activity of a user, whether to trigger the sending of the UE assistance information; some UEs may determine, according to ON or OFF of a screen of a terminal, whether to trigger the sending of the UE assistance information; and some UEs may determine, according to a situation of a currently operating service, whether to trigger the sending of the UE assistance information. This embodiment is merely an example for description.

The foregoing embodiment merely limits the sending of the UE assistance information by the UE; persons skilled in the art may understand that the UE usually triggers the UE assistance information before sending the UE assistance information. How the UE triggers the sending of the UE assistance information is not limited in the embodiment of the present invention.

In another embodiment of the present invention, a method for reporting user equipment assistance information includes: receiving UE assistance information sent by a UE when a configuration of the UE for forbidding sending the UE assistance information is not started or is closed; or, receiving UE assistance information sent by a UE when a configuration of the UE for allowing sending the UE assistance information is started.

Therefore, the foregoing method for reporting user equipment assistance information enables the UE to regularly report the UE assistance information, thereby effectively reducing a signaling overhead of an air interface.

Figure 5:
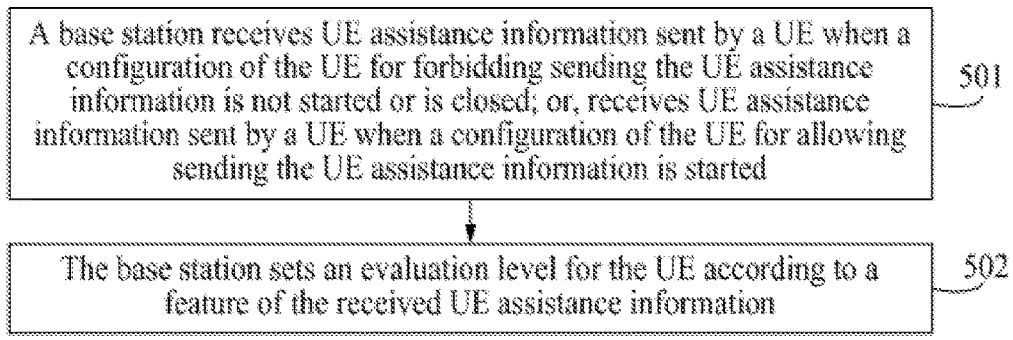
FIG. 5 is a schematic flow chart of a method for reporting user equipment assistance information provided in another embodiment of the present invention.

FIG. 5 shows a schematic flow chart of a method for reporting user equipment assistance information provided in an embodiment of the present invention. As shown in FIG. 5, the method for reporting user equipment assistance information in this embodiment is described as follows.

501: A base station receives UE assistance information sent by a UE when a configuration of the UE for forbidding sending the UE assistance information is not started or is closed; or, receives UE assistance information sent by a UE when a configuration of the UE for allowing sending the UE assistance information is started.

502: The base station sets an evaluation level for the UE according to a sending feature of the UE assistance information.

It should be understood that the setting an evaluation level for the UE according to a sending feature of the UE assistance information is merely an example for description herein, for example, the setting an evaluation level for the UE according to a sending feature of the UE assistance information may be: setting an evaluation level for the UE according to one or more of the following: whether content of the UE assistance information reported by the UE is reasonable, whether the number of times that the UE reports the UE assistance information is reasonable, and whether time at which the UE reports the UE assistance information is reasonable, and the like. In actual application, the base station may obtain, according to receiving time of the UE assistance information, the time at which the UE reports the UE assistance information. Certainly, in another embodiment, the evaluation level may further be set for the UE according to implementation of the received UE assistance information.

For example, the base station determines, by using assistance information reported by the UE in one or more times, whether the implementation or feature of the UE is reasonable, and sets an evaluation level for the UE, for example, a first level: "good UE implementation", or a third level: "bad UE implementation", and sends the evaluation level to an MME for storage at the right moment.

The right moment may be that the base station notifies the MME when detecting that the UE is of "bad UE implementation" or "good UE implementation", or the base station notifies the MME when releasing an RRC connection; or reporting time for the base station is not limited.

The MME usually stores the evaluation level of the UE, and when detecting that a capability (for example, a bandwidth supported by the UE) of the UE is changed, the MME may not store the information.

Further, the foregoing method may further include step 503 not shown in FIG. 5.

503: The base station sends information of the evaluation level set for the UE to the MME, so that when the UE is switched to another base station, the MME sends the evaluation level of the UE to a target base station.

Certainly, when the UE again enters the RRC connection status, the MME notifies the base station of the "bad UE implementation" or "good UE implementation", so as to assist the base station to perform a configuration on the UE assistance information for the UE.

Or, when the UE is switched from a source base station to a target base station, the source base station sends the foregoing evaluation level to the target base station as reference for the target base station.

Figure 6:
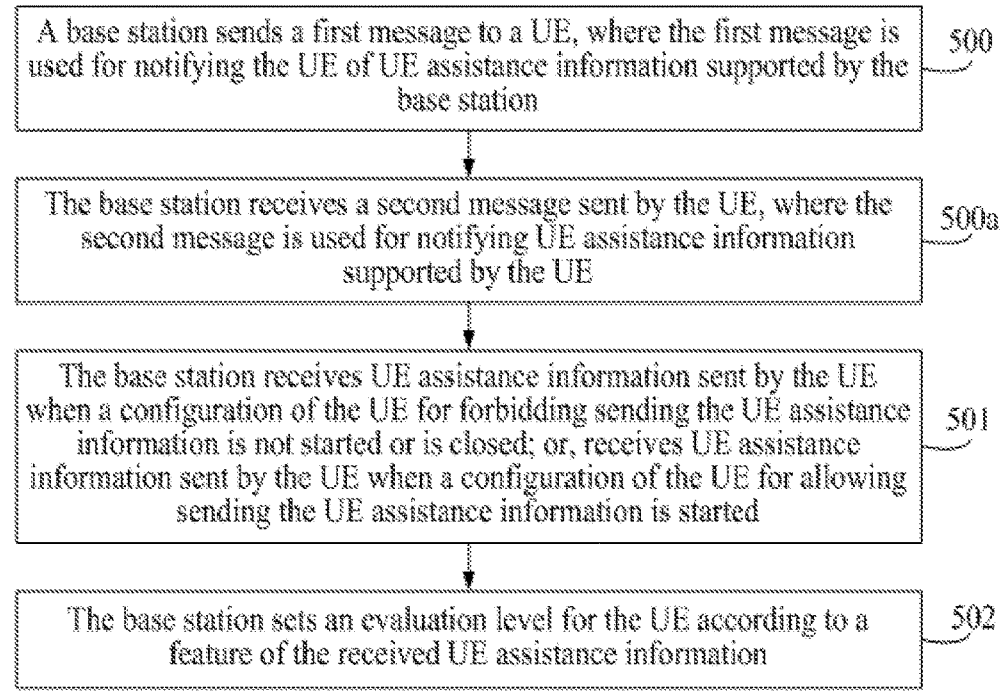
FIG. 6 is a schematic flow chart of a method for reporting user equipment assistance information provided in another embodiment of the present invention.

Further, as shown in FIG. 6, before step 501, the method for reporting user equipment assistance information further includes the following step 500.

500: The base station sends a first message to the UE, where the first message is used for notifying the UE of UE assistance information supported by the base station.

Preferably, the base station sends the foregoing first message in a broadcast manner.

For example, the first message further includes information of an RB where the UE assistance information is located and/or attribute information of the UE assistance information, and the like.

Preferably, FIG. 6 further shows step 500a included in the method for reporting user equipment assistance information.

500a: The base station receives a second message sent by the UE, where the second message is used for notifying UE assistance information supported by the UE.

It can be known from the foregoing UE assistance information reporting method that, the UE first negotiates with the base station on mutually supported UE assistance information, so that the UE may regularly report the negotiated UE assistance information, thereby effectively reducing a signaling overhead of an air interface.

Figure 7:
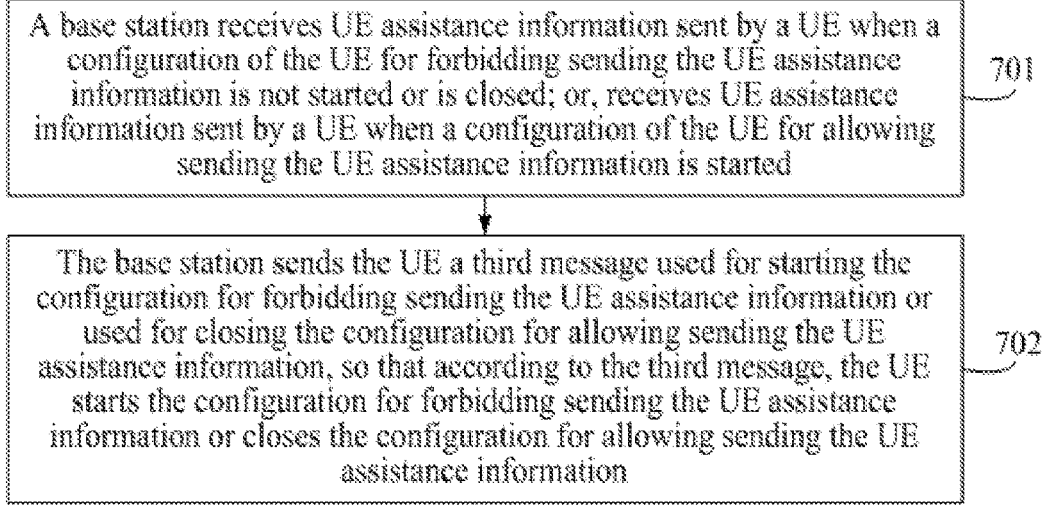
FIG. 7 is a schematic flow chart of a method for reporting user equipment assistance information provided in another embodiment of the present invention.

As shown in FIG. 7, FIG. 7 shows a schematic flow chart of a method for reporting user equipment assistance information provided in an embodiment of the present invention; and the method for reporting user equipment assistance information in this embodiment is described as follows.

701: A base station receives UE assistance information sent by a UE when a configuration of the UE for forbidding sending the UE assistance information is not started or is closed; or, receives UE assistance information sent by a UE when a configuration of the UE for allowing sending the UE assistance information is started.

It should be noted that the base station may optimize performance of the UE according to the received UE assistance information herein, and how the optimization is specifically performed depends on a capability of the base station. For example, the base station takes one or more of the following factors into consideration: the UE assistance information reported by the UE, a current network status, and an algorithm policy of the base station, and the like, to determine whether to optimize the performance of the UE and how to perform the optimization.

702: The base station sends the UE a third message used for starting the configuration for forbidding sending the UE assistance information or used for closing the configuration for allowing sending the UE assistance information, so that according to the third message, the UE starts the configuration for forbidding sending the UE assistance information or closes the configuration for allowing sending the UE assistance information.

Further, the method for reporting user equipment assistance information further includes step 703 not shown in FIG. 7.

703: The base station sends the UE a fourth message used for closing the configuration which is started by the UE and is for forbidding sending the UE assistance information or used for starting the configuration of the UE for allowing sending the UE assistance information.

For example, the fourth message may be an RRC reconfiguration message, a reconfiguration message including a DRX parameter, or a message sent for acquiring the UE assistance information, or the like. Then, the base station enables, by sending the foregoing third message or fourth message, the UE to regularly report the UE assistance information.

It can be known from the foregoing method for reporting user equipment assistance information that, the foregoing UE may regularly report the assistance information, thereby effectively reducing a signaling overhead of an air interface.

Figure 8:
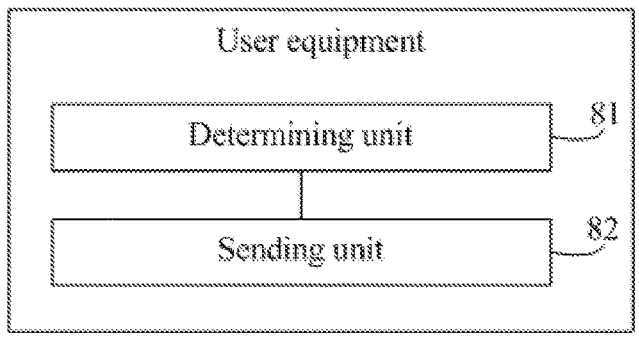
FIG. 8 is a schematic structural diagram of a user equipment provided in another embodiment of the present invention.

In another aspect of the present invention, the present invention provides a user equipment. As shown in FIG. 8, the user equipment includes a determining unit 81 and a sending unit 82, where the determining unit 81 is configured to: if determining that a configuration in the UE for forbidding sending UE assistance information is not started or is closed, transmit, to the sending unit 82, an instruction for sending the UE assistance information; or if determining that a configuration in the UE for allowing sending UE assistance information is started, transmit, to the sending unit 82, an instruction for sending the UE assistance information; and the sending unit 82 is configured to send the UE assistance information to abase station when receiving the instruction which is transmitted by the determining unit 81 and is for sending the UE assistance information.

The assistance information may be one or more pieces of the following information:

a power saving preference of the UE, a performance preference of the UE, a service feature of the UE, a moving speed of the UE, and a parameter indicating the moving speed of the UE, and the like.

Further, the user equipment in this embodiment further includes a receiving unit not shown in FIG. 8. The receiving unit is configured to receive a first message sent by the base station, where the first message is used for notifying the UE of UE assistance information supported by the base station. Certainly, in another embodiment, the foregoing first message may further include one or more pieces of the following information: information of an RB where the UE assistance information is located, attribute information of the UE assistance information, and the like.

In actual application, the determining unit 81 is specifically configured to: when a first condition is met, start the configuration for forbidding sending the UE assistance information or close the configuration for allowing sending the UE assistance information; and when a second condition is met, close the started configuration for forbidding sending the UE assistance information or start the configuration for allowing sending the UE assistance information.

The first condition is one or more of the following conditions:

the receiving unit receives a message which is sent by the base station and is used for starting the configuration for forbidding sending the UE assistance information or used for closing the configuration for allowing sending the UE assistance information; and a duration after the sending unit sends the UE assistance information to the base station reaches a preset duration.

The second condition is one or more of the following conditions:

the receiving unit receives an RRC reconfiguration message sent by the base station;

the receiving unit receives a reconfiguration message which is sent by the base station and includes a DRX parameter;

a DRX cycle in the DRX parameter included in the reconfiguration message which is sent by the base station and is received by the receiving unit reaches a pre-configured DRX cycle or reaches an idle status DRX cycle;

the receiving unit receives the instruction which is sent by the base station and is for acquiring the UE assistance information;

a duration in which the configuration for forbidding sending the UE assistance information is started reaches a preset threshold, or a duration in which the configuration for allowing sending the UE assistance information is closed reaches a preset threshold;

the UE changes an RRC connection status; and content of the UE assistance information is changed.

Correspondingly, the foregoing sending unit 82 is specifically configured to: send the UE assistance information to the base station by using an uplink resource; or when the receiving unit receives the instruction which is sent by the base station and is for acquiring the UE assistance information, send, according to the instruction for acquiring the UE assistance information, the UE assistance information to the base station by using an uplink resource. In actual application, if the uplink resource can accommodate all data which can be transmitted and the uplink resource still can transmit the UE assistance information, the UE assistance information is sent to the base station by using the uplink resource.

Further, the foregoing sending unit 82 is further configured to send a second message to the base station, where the second message is used for notifying UE assistance information supported by the UE.

The foregoing user equipment is configured to execute the foregoing method for reporting user equipment assistance information, and this embodiment is merely used for simply describing an internal structure of the user equipment. For a specific principle, reference may be made to the description in the foregoing method embodiments.

The foregoing user equipment may regularly report the UE assistance information to the base station, thereby effectively reducing a signaling overhead of an air interface, and meanwhile, the base station may optimize performance of the UE according to the UE assistance information.

In another aspect of the present invention, the present invention provides a base station, which includes a receiving unit 91, where the receiving unit 91 is configured to receive UE assistance information sent by a UE when a configuration of the UE for forbidding sending the UE assistance information is not started or is closed; or, receive UE assistance information sent by a UE when a configuration of the UE for allowing sending the UE assistance information is started.

Figure 9:
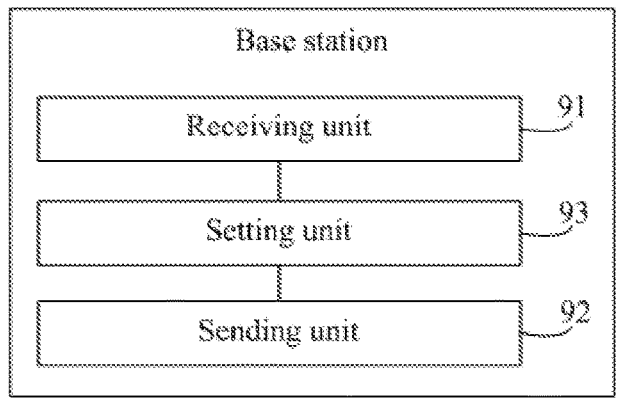
FIG. 9 is a schematic structural diagram of a base station provided in another embodiment of the present invention.

In actual application, the foregoing base station further includes a sending unit 92, as shown in FIG. 9. The sending unit is configured to send a first message to the UE, where the first message is used for notifying the UE of UE assistance information supported by the base station.

Preferably, the foregoing sending unit 92 is further configured to send a third message or a fourth message to the UE, for example, is further configured to send the UE the third message used for starting the configuration for forbidding sending the UE assistance information or used for closing the configuration for allowing sending the UE assistance information, so that according to the third message, the UE starts the configuration for forbidding sending the UE assistance information or closes the configuration for allowing sending the UE assistance information.

Or, the sending unit 92 is further configured to send the UE the fourth message used for closing the configuration which is started by the UE and is for forbidding sending the UE assistance information or used for starting the configuration of the UE for allowing sending the UE assistance information, where the fourth message may be an RRC reconfiguration message, a reconfiguration message including a DRX parameter, or a message sent for acquiring the UE assistance information, or the like.

Further, the base station further includes a setting unit 93, where the setting unit 93 sets an evaluation level for the UE according to a sending feature of the UE assistance information.

The base station is configured to execute the foregoing method for reporting user equipment assistance information, and this embodiment is merely used for simply describing an internal structure of the base station. For a specific principle, reference may be made to the description in the foregoing method embodiments.

The foregoing base station may optimize the UE according to assistance information regularly reported by the UE, thereby effectively reducing a signaling overhead of an air interface.

It should be noted that the base station in this embodiment is abroad concept, which may be a base transceiver station, abase station controller, a NodeB, an eNodeB, or a radio network controller (RNC), or the like, which is not limited in this embodiment and is set according to actual requirements.

It should be noted that, in the foregoing embodiments of the user equipment and the base station, dividing of the functional units is merely an example for description. In actual application, the foregoing functions may be allocated to and completed by different functional units according to requirements, for example, in consideration of configuration requirements of corresponding hardware and convenience of implementation of software, that is, internal structures of the user equipment and the base station are divided into different functional units to implement all or part of functions described above. In addition, in actual application, corresponding functional units in the embodiments may be implemented by corresponding hardware, or may also be implemented by corresponding hardware executing corresponding software. For example, the foregoing sending unit may be hardware with a function of the foregoing sending unit, for example, a transmitter, or may also be a general processor or another hardware device capable of executing a corresponding computer program to implement the foregoing functions. For another example, the foregoing determining unit may be hardware capable of executing a function of the determining unit, for example, a processor, or may also be another hardware device capable of executing a corresponding computer program to implement the foregoing functions. For still another example, the foregoing receiving unit may be hardware capable of executing a function of the foregoing receiving unit, for example, a receiver, or may also be a general processor or another hardware device capable of executing a corresponding software program to implement the foregoing functions. (All the embodiments provided in the specification may apply the principle described above)

In another aspect of the present invention, the present invention provides a communications system, which includes the user equipment in the foregoing embodiment and the base station in the foregoing embodiment.

For structures and functions of the user equipment and the base station, reference may be made to the foregoing embodiment of the user equipment and the foregoing embodiment of the base station.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to part or all of the technical features of the technical solutions described in the foregoing embodiments; however, these modifications or replacements do not make the essence of the corresponding technical solutions depart from the scope of the technical solutions of the embodiments of the present invention.

What is claimed is:

1. A method, comprising:

detecting, by a user equipment (UE), a change of UE assistance information, wherein the change of the UE assistance information is any one of the UE assistance information being changed from a power saving preference into a performance preference, or the UE assistance information being changed from the performance preference into the power saving preference;

sending, by the UE, the UE assistance information to a base station when the change of the UE assistance information occurs and a timer is not running; and starting, by the UE, the timer with a timer length during which the UE assistance information is not allowed to be sent if sent UE assistance information is the performance preference;

wherein the UE assistance information is sent via a radio resource control (RRC) message; and the RRC message is borne on a dedicated signaling radio bearer established between the base station and the UE.

2. The method according to claim 1, wherein the method further comprising:

receiving, by the UE, a first message from the base station, wherein the first message indicates to the UE to send the UE assistance information.

3. An apparatus, comprising:

a storage medium including executable instructions; and a processor, wherein the executable instructions, when executed by the processor, cause the processor to:

detect a change of UE assistance information, wherein the change of the UE assistance information is any one of the UE assistance information being changed from a power saving preference into a performance preference, or the UE assistance information being changed from the performance preference into the power saving preference;

send the UE assistance information to a base station in when the change of UE assistance information occurs and a timer is not running; and start the timer with a timer length during which the UE assistance information is not allowed to be sent if sent UE assistance information is the performance preference;

wherein the UE assistance information is sent via a radio resource control (RRC) message; and the RRC message is borne on a dedicated signaling radio bearer established between the base station and the UE.

4. The apparatus according to claim 3, wherein the executable instructions, when executed by the processor, further cause the apparatus to:

receive a first message from the base station, wherein the first message indicates to the UE to send the UE assistance information.

5. A user equipment, comprising: a transmitter, a receiver, and a processor, coupled with the transmitter and the receiver, wherein the processor is configured to: detect a change of UE assistance information, wherein the change of the UE assistance information is any one of the UE assistance information being changed from a power saving preference into a performance preference, or the UE assistance information being changed from the performance preference into the power saving preference;

the transmitter is configured to: send the UE assistance information to a base station when the processor identifies that the change of UE assistance information occurs and a timer is not running; and the processor is further configured to: start the timer with a timer length during which the UE assistance information is not allowed to be sent if sent UE assistance information is the performance preference;

wherein the UE assistance information is sent via a radio resource control (RRC) message; and the RRC message is borne on a dedicated signaling radio bearer established between the base station and the UE.

6. The user equipment according to claim 5, wherein the receiver is configured to: receive a first message from the base station, wherein the first message indicates to the UE to send the UE assistance information.

* * * * *